United States Patent
Betawadkar-Norwood et al.

(10) Patent No.: US 10,120,898 B1
(45) Date of Patent: Nov. 6, 2018

(54) APPARATUS AND METHOD FOR ALLOWING COMPLEX AGGREGATES IN ANALYTICAL VIEWS IN A DISTRIBUTED DATABASE

(71) Applicant: Arcadia Data Inc., San Mateo, CA (US)

(72) Inventors: Anjali Betawadkar-Norwood, Campbell, CA (US); Douglas J. Cameron, Santa Cruz, CA (US); Rachit Agarwal, Sunnyvale, CA (US); Shant Hovsepian, New York, NY (US)

(73) Assignee: Arcadia Data Inc., San Mateo, CA (US)

( * ) Notice: Subject to any disclaimer, the term of this patent is extended or adjusted under 35 U.S.C. 154(b) by 279 days.

(21) Appl. No.: 15/230,261

(22) Filed: Aug. 5, 2016

(51) Int. Cl.
*G06F 17/30* (2006.01)

(52) U.S. Cl.
CPC .. *G06F 17/30451* (2013.01); *G06F 17/30477* (2013.01)

(58) Field of Classification Search
None
See application file for complete search history.

(56) References Cited

U.S. PATENT DOCUMENTS

| | | | | |
|---|---|---|---|---|
| 5,874,953 | A * | 2/1999 | Webster | G06F 17/30719 707/E17.094 |
| 5,949,413 | A * | 9/1999 | Lerissa | G06F 17/30873 707/E17.093 |
| 7,281,229 | B1 * | 10/2007 | Jayapalan | G06T 15/20 345/419 |
| 7,467,127 | B1 * | 12/2008 | Baccash | G06F 17/30592 |
| 8,471,593 | B2 * | 6/2013 | Vorbach | G06F 15/7867 326/41 |
| 9,507,843 | B1 * | 11/2016 | Madhavarapu | G06F 17/30575 |
| 9,613,120 | B1 * | 4/2017 | Kharatishvili | G06F 17/30575 |
| 9,842,031 | B1 * | 12/2017 | Kharatishvili | G06F 11/1474 |
| 2009/0177697 | A1 * | 7/2009 | Gao | G06F 17/30457 |
| 2014/0172827 | A1 * | 6/2014 | Nos | G06F 17/30424 707/722 |
| 2014/0279977 | A1 * | 9/2014 | Milousheff | G06F 17/30309 707/695 |

* cited by examiner

*Primary Examiner* — Hung D Le
(74) *Attorney, Agent, or Firm* — COOLEY LLP

(57) ABSTRACT

A system has worker machines connected by a network. Each worker machine stores at least one partition of a distributed database and a partial function module to initialize a database dimension, increment an aggregate of the database dimension in response to a data change and to serialize a last aggregate of the database dimension in response to a refresh operation to form partial results of an analytical view. An analytical view machine connected to the network responds to a query without accessing a partition of the distributed database. The analytical view machine merges partial results from the worker machines to produce a final result to the query.

6 Claims, 4 Drawing Sheets

APPARATUS AND METHOD FOR ALLOWING COMPLEX AGGREGATES IN ANALYTICAL VIEWS IN A DISTRIBUTED DATABASE

FIELD OF THE INVENTION

This invention relates generally to processing of data in a distributed database. More particularly, this invention relates to techniques for computing analytical views using partial-final functions, thereby allowing complex aggregates in analytical views of a distributed database.

BACKGROUND OF THE INVENTION

A distributed database is a database in which storage devices are not all attached to a common processing unit, such as a central processing unit. Instead, multiple computers are used to implement a distributed database management system. The multiple computers may be located in the same physical location, or they may be dispersed over a network of disaggregated interconnected computers. There is typically a master node and a set of slave or worker nodes that store partitions of the distributed database.

An analytical view is a subset of data from a table or multiple tables. The analytical view may be computed by applying joins, unions, applying filters or other Structured Query Language (SQL) operations to the table or tables. The analytical view typically comprises dimensions and measures, although either dimensions or measures may be absent. The analytical view may comprise an attribute (e.g., a column name or dimension) and a measure (e.g., an aggregate, such as sum, min, max) that is defined prior to the receipt of a query and is maintained as a data unit separate from the table. An attribute can be a dimension or a measure. When data is grouped along an attribute, it becomes a dimension. When data is aggregated on an attribute, it becomes a measure. For example, in the case of the request for 'sum(amt) by product_id', product_id and amt are both attributes in the table. Product_id is used as a dimension and amt is used as a measure. The analytical view exposes a dimension 'product_id' and an aggregate 'sum(amt)'.

Database systems use analytical views to expedite query processing. Analytical views typically materialize (e.g., cache) data resulting from computations frequently needed by queries. When a database system can prove that, semantically, it is correct to answer the query using the data in an analytical view, the system uses the pre-aggregated data from the analytical view to save processor and input/output bandwidth. This results in expedited processing of the query.

Aggregate functions like, sum, count, min and max are easily decomposable and are therefore straightforward to embed and use in analytical views. However, other aggregate functions like, number of distinct values, average, standard deviation and variance are not so easily decomposable and therefore require special processing.

Accordingly, there is a need to compute and cache complex aggregates in a distributed database, such that the cached aggregates can be combined to yield results when needed.

SUMMARY OF THE INVENTION

A system has worker machines connected by a network. Each worker machine stores at least one partition of a distributed database and a partial function module to initialize a database dimension, increment an aggregate of the database dimension in response to a data change and to serialize a last aggregate of the database dimension in response to a refresh operation to form partial results of an analytical view. An analytical view machine connected to the network responds to a query without accessing a partition of the distributed database. The analytical view machine merges partial results from the worker machines to produce a final result to the query.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
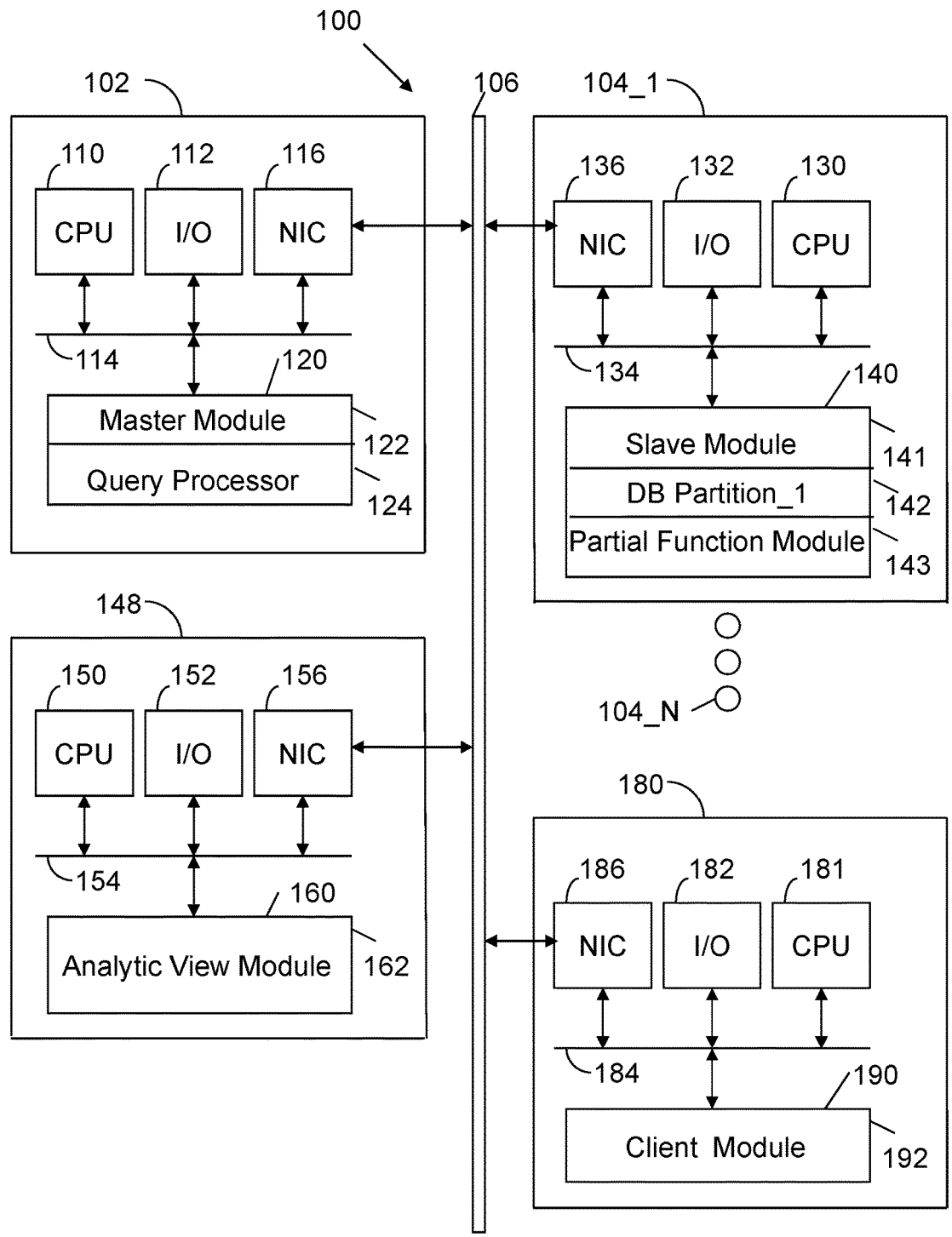
FIG. 1 illustrates a system configured in accordance with an embodiment of the invention.

FIG. 1 illustrates a system 100 configured in accordance with an embodiment of the invention. The system implements a distributed database across a master machine 102 and a set of worker or slave machines 104_1 through 104_N, which communicate via a network 106, which may be any combination of wired and wireless networks. The master machine 102 includes standard components, such as a central processing unit 110 and input/output devices 112 connected via a bus 114. The input/output devices 112 may include a keyboard, mouse, touch display and the like. A network interface circuit 116 is also connected to the bus 114 and provides connectivity to network 106. A memory 120 is also connected to the bus 114. The memory 120 includes instructions executed by the central processing unit 110. In particular, the memory 120 stores a master module 122, which includes executable instructions to perform master node operations associated with a distributed database. The memory 120 also stores a query processor 124, which coordinates processing of queries across the slave machines 104_1 through 104_N.

Worker machine 104_1 also includes standard components, such as a central processing unit 130, input/output devices 132, a bus 134, a network interface circuit 136 and a memory 140. The memory 140 stores a slave module 141 to implement slave processing at the direction of the master machine 102. The memory 140 also stores at least one database partition 142 of a distributed database. In addition, the memory 140 stores a partial function module 143 to implement operations of the invention. The partial function module 143 includes executable instructions to initialize a database dimension, then update a change in an aggregate of the database dimension and then serialize (i.e., communicate to another node) the last aggregate. The partial function module 143 also merges and finalizes partial results for each dimension processed in accordance with the invention.

An analytical view machine 148 may also be connected to network 106. The analytical view machine 148 also includes standard components, such as a central processing unit 150, input/output devices 152, a bus 154, a network interface circuit 156 and a memory 160. The memory 160 stores an analytic view module 162. The analytic view module 162 includes instructions executed by the central processing unit 150 to implement operations disclosed herein. In particular, the analytic view module 162 merges partial results received from the worker machines 104_1 through 104_N to produce a final result to a query. The result is based upon the analytical view without accessing a partition of the distributed database.

FIG. 1 also illustrates a client machine 180 connected to network 106. The client machine 180 includes standard components, such as a central processing unit 181, input/output devices 182, a bus 184, a network interface circuit 186 and a memory 190. The memory 190 stores a client module 192, which allows the client machine to pass queries to the analytic view module 162. The analytical view machine 148 provides the client machine 180 with an analytical view. The components of analytical view machine 148 may be incorporated into master machine 102 and vice versa.

Figure 2:
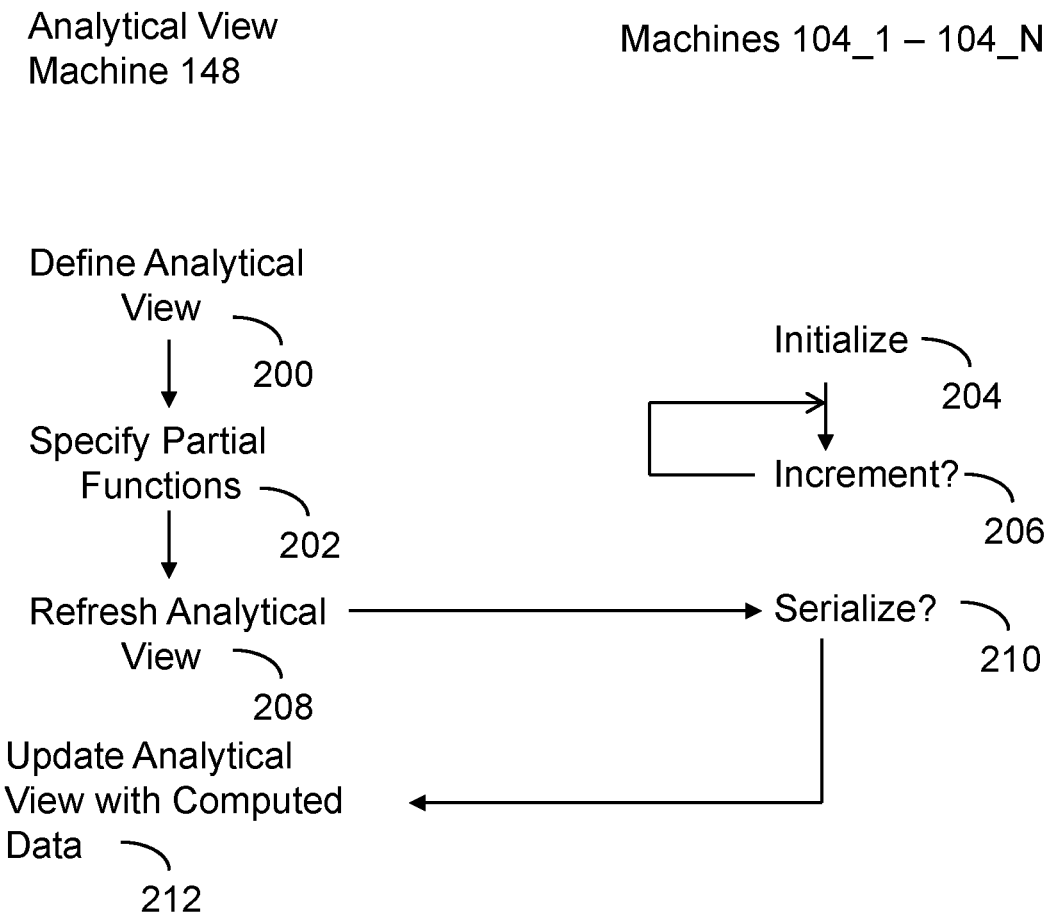
FIG. 2 illustrates distributed processing refresh operation performed in accordance with an embodiment of the invention.
Figure 3:
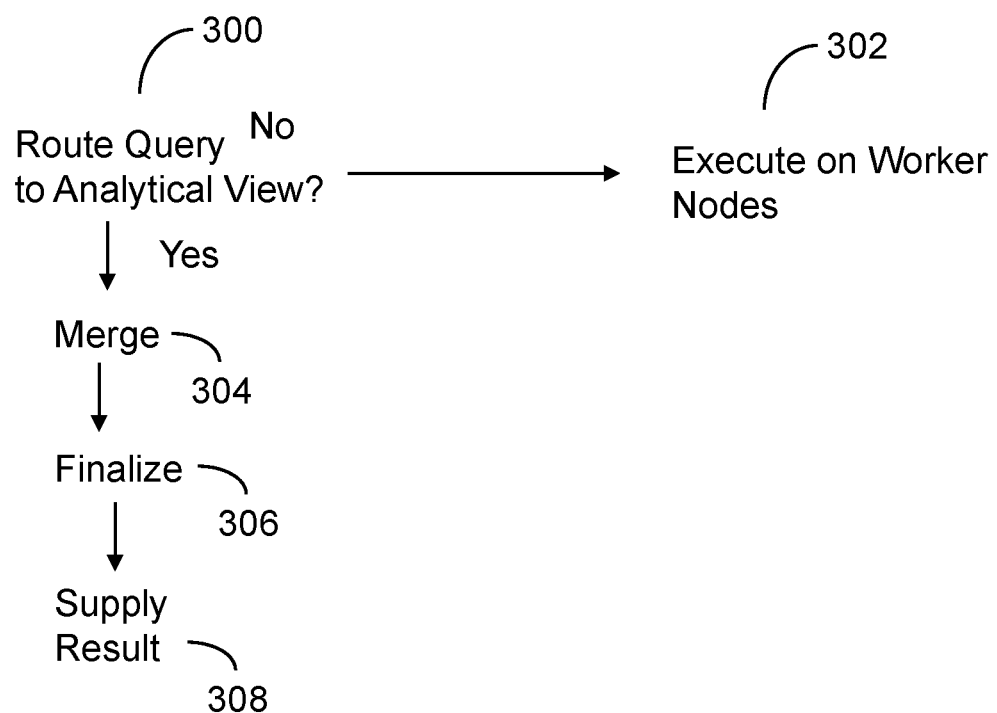
FIG. 3 illustrates distributed processing query processing performed in accordance with an embodiment of the invention.

FIG. 2 illustrates processing performed across analytical view machine 148 and worker machines 104_1 through 104_N. Initially, an analytical view is defined 200. Partial functions are then specified for the analytical view 202. To support the analytical view, the partial function module on each worker machine initializes a value 204. It then increments the value 206 upon each data change.

When the analytical view machine 148 initiates a refresh of the analytical view 208, results from each worker machine 104_1 are serialized 210 and are sent to the analytical view machine 148 to update the analytical view with computed data 212. The computed data is the merged partial results from the different worker machines 104.

Upon receipt of a query, a decision is made whether an analytical view can answer the query 300. If not (300—No), the query is executed on the worker nodes 302. If so (300—Yes), partial results stored in the analytical view are merged 304, finalized 306 and supplied as results to the query.

Figure 4:
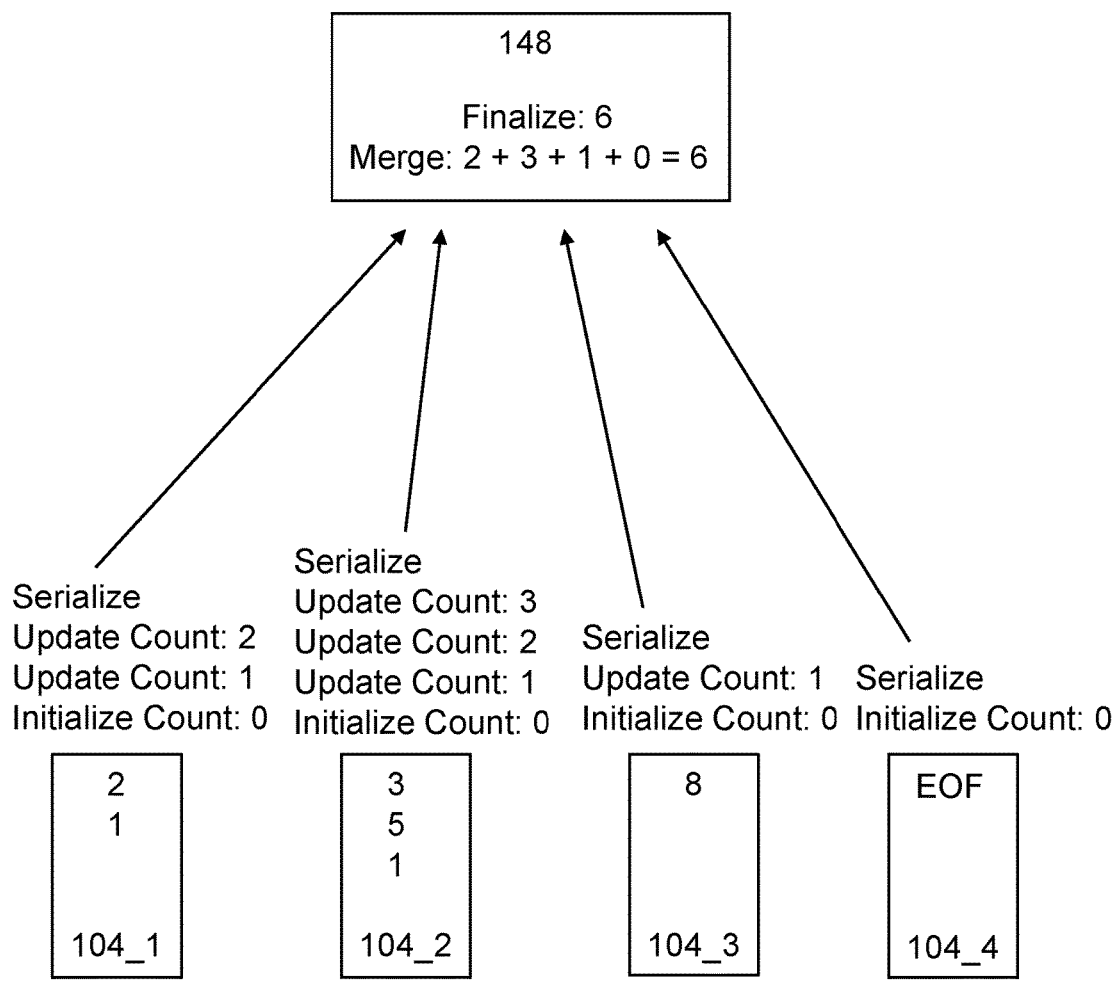
FIG. 4 illustrates initialize, update, serialize, merge and finalize operations performed in accordance with an embodiment of the invention.

These operations are more fully appreciated with reference to FIG. 4. FIG. 4 illustrates client machines 104_1 through 104_4 that maintain an aggregate function of count. Machine 104_1 initializes the count value to 0 and then receives two updated count values (1, 2) in response to values 1 and 2 being generated. The last count value of 2 is then serialized and sent to analytical view machine 148 as a partial result. This may be done in response to a refresh operation or a query that involves the count value. Similarly, machine 104_2 initializes the value count and then updates the count value three times in response to values 3, 5 and 1. The last count value of 3 is serialized and sent to analytical view machine 148 as a partial result. Machine 104_3 initializes a count value, updates the count value to 1 in response to the value 8 and then serializes the value to analytical view machine 148. Machine 104_4 initializes the count value to zero, but never receives a value and therefore there is no update count value. Accordingly, the serialized value sent to the analytical view machine is 0. As shown in FIG. 4, the analytical view machine merges the received partial results of 2, 3, 1, and 0 to form a sum of 6, which is the final value.

The 'sum of counts' example of FIG. 4 is designed to show how the database system breaks down the computation into the steps of: initialize, update, serialize, exchange, merge and finalize. Serialize-exchange-merge can happen multiple times. The same infrastructure is used to compute other functions like number of distinct values, average, standard deviation, approximate median, etc. For these other functions, the partial results are not as simple as what we see for the sum of counts example. So, if one were to show the figure for other functions like number of distinct values, one would simply replace the 'partial count' by 'partial NDV result'. The set of functions and their accuracy is fixed; it is not configurable by the user. NDV and approximate_median both compute approximate results (approximate number of distinct values and approximate median respectively) since computing exact results is extremely expensive for these functions and users find approximate results acceptable for these functions.

Most distributed database systems have implemented infrastructure that allows distributed computation of aggregate functions. The core issue is that the complex aggregates are not so easily decomposable or in other words, not so easily combinable. A distributed system by nature stores the data in the tables on different nodes. In order to exploit the processing power of nodes and for collocation of operation with the data, it stands to reason that the complex aggregate be computed on worker nodes in parallel and the results obtained by this local computation be combined in order to get final global results.

For example, a table age_table may be defined with two attributes 'name' and 'age'. In a distributed system, this table may be stored in a partitioned fashion across multiple nodes. The partitioning scheme used may be hash partitioning (where the data is distributed by hashing one of the attributes, say 'name'), may be range partitioned (e.g., names starting with letters 'A' through 'D' are located on node 1, while names starting with 'E' through 'G' are located on node 2, etc.), or random partitioning where the data in the table is spread in a round robin fashion across nodes.

Irrespective of the partitioning used, if the query asks to compute average age of people in the age_table, it would be expedient to first compute average age of people locally on each node and then combine those averages (partial results) into a final average result. But 'average' is not combinable, i.e., an average of averages is not the same as computing an average of the data in the age_table by first moving all the data to one node.

It is known that average is computed by dividing sum by the count of entries. Sum and count are known to be easily combinable. So, if partial sums and counts were computed on each node, they could be combined as follows:

Final_sum=sum(partial_sum)

Final_count=sum(partial_count)

Average=final_sum/final_count.

Many distributed algorithms with varying efficiencies exist to compute other complex aggregates, such as standard deviation, number of distinct values, etc. The distributed database provides the infrastructure to compute aggregates using initialize-update-serialize-merge-finalize infrastructure. This infrastructure is illustrated using the 'sum of counts' example. As long as the algorithms for complex aggregates can be broken down into the initialize-update-serialize-merge-finalize steps, it can be used by the distributed system.

Given the distributed database infrastructure described above, the invention stores the partial result—typically the output of the update-serialize step—in an analytical view. When an input query is processed and the query processor decides to answer the query using an analytical view, the partial results of the complex aggregates stored in the analytical view need to be finalized using the 'merge' operation. The merge operation is necessary for two reasons. First, the analytical view itself may be partitioned—hence the data in it is distributed. Second, consider the example regarding how queries can ask for monthly sales and yearly sales and how analytical views store monthly data that can be combined to compute yearly data.

An important point here is that the database provides the update-merge infrastructure. The analytic view module 162 knows to intercept and store the partial results of complex aggregation when the analytic view is refreshed and it also knows to invoke the 'merge' and other relevant aspects of the infrastructure when the query result needs to be generated using analytic views.

Consider the case where a user is sometimes interested in monthly sales and sometimes in yearly sales. The user issues the query:
select year, month, sum(amt) from sales group by year, month;
and sometimes
select year, sum(amt) from sales group by year;

If one wants to accelerate both these queries, one needs to create an analytical view that provides sum(amt) on a monthly level (the finest granularity). This analytical view can be used to answer the monthly sales query. The data in the analytical view can also be rolled up to answer the yearly sales query (which asks for data at a higher granularity).

So, the analytical view definition looks like:
create analytical view aview stored as parquet as select year, month, sum(amount) from sales group by year, month;

In this context, consider the following example data in 'sales' table:

| year | month | amt |
|------|-------|-----|
| 2015 | 11    | 10  |
| 2015 | 11    | 20  |
| 2015 | 12    | 15  |
| 2015 | 12    | 11  |
| 2016 | 01    | 13  |
| 2016 | 01    | 27  |

The data in the analytical view will look like:

| year | month | sum(amt) |
|------|-------|----------|
| 2015 | 11    | 30       |
| 2015 | 12    | 26       |
| 2016 | 01    | 40       |

The data in the analytical view answers the monthly sales query. The yearly sales can be obtained by merging the rows with the same year together (in this example, the first two rows).

| year | sum(amt) |
|------|----------|
| 2015 | 56       |
| 2016 | 40       |

An embodiment of the invention is implemented by specifying keywords of 'PARTIAL' and 'FINAL' to the analytical view syntax to denote if the view contains partial aggregates or the finalized aggregates. The default is 'PARTIAL' and therefore can be omitted from a statement.
    CREATE [PARTIAL|FINAL] ANALYTICAL VIEW . . . .

Consider the example of a "number of distinct values" or ndv function. This function comes in three flavors: 1) The original function 'ndv', 2) The partial version of the function 'ndv_no_final' and 3) The final version of the function 'ndv_final'. Note that the result of 1) and 3) are the same and also that ndv(x)=ndv_final(ndv_no_final(x)). The analytical view may be created as a partial analytical view as follows:
    create partial analytical view aview1 stored as parquet as
        select name, ndv(event id) from events group by name;
    refresh analytical view aview1;

Even though the analytical view definition uses the function 'ndv', the analytic view module 162 stores the result of 'ndv_no_final(event_id)' since the analytical view is defined to be partial. For an analytical view definition of the type below, the analytic view module 162 internally stores the result of 'ndv(event_id)' since the analytical view is defined to be final.
    create final analytical view aview2 stored as parquet as
        select name, ndv(event id) from events group by name;
    refresh analytical view aview2;

The analytical view module 162 has code that registers functions when the system is started. These functions can be listed in a database. The partial and final versions of the functions need to be added so that they are registered with the analytic view module 162. In one embodiment, the code takes care of various data types of input parameters by overloading the function signature. When a partial analytical view is being created, the original function (e.g., ndv) needs to be replaced by its partial version (e.g., ndv_no_final). When a final analytical view is being created, the original aggregate is used as is.

While matching a query to a partial analytical view, the matching infrastructure needs to be aware that the original function (e.g., ndv) matches the partial function (e.g., ndv_no_final) in the analytical view. When expressions in a query are being substituted from a partial analytical view, the partial aggregate functions need to be finalized, for example, by applying 'ndv_final' to the intermediate results in the analytical view.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
a plurality of worker machines connected by a network, each worker machine storing at least one partition of a distributed database and a partial function module to initialize a database dimension, increment an aggregate of the database dimension in response to a data change and to serialize a last aggregate of the database dimension in response to a refresh operation to form partial results of an analytical view; and
an analytical view machine connected to the network to respond to a query without accessing a partition of the distributed database, the analytical view machine merging partial results from the plurality of worker machines to produce a final result to the query.

2. The system of claim 1 wherein the aggregate of the database dimension is a decomposable measure.

3. The system of claim 1 wherein the aggregate of the database dimension is not a decomposable measure.

4. The system of claim 3 wherein the aggregate of the database dimension that is not a decomposable measure is an estimate supplied by a database management system associated with the distributed database.

5. The system of claim 1 wherein the analytical view machine merges partial results from the plurality of worker machines to aggregate data along a hierarchical dimension and thereby define an analytical view that is maintained as a data unit separate from the distributed database prior to the receipt of a query applied to the analytical view.

6. The system of claim 1 further comprising a client machine connected to the network to secure the final result from the analytical view machine.

* * * * *